Patented July 3, 1923.

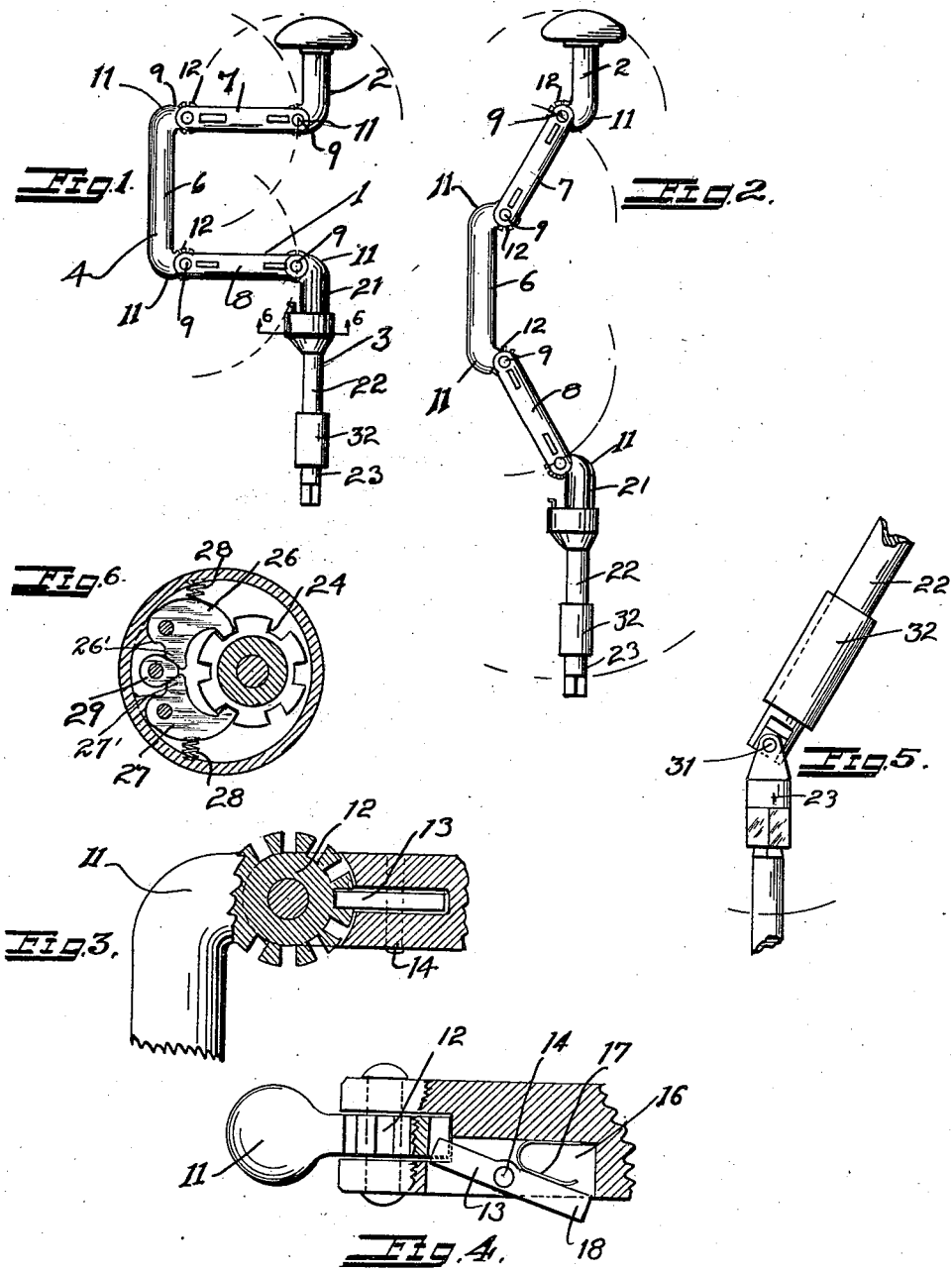

1,460,593

UNITED STATES PATENT OFFICE.

WILLIAM LEMOIGNE, OF COLUSA, CALIFORNIA, ASSIGNOR OF ONE-FOURTH TO EDWARD BOGART AND ONE-FOURTH TO A. WEISS, BOTH OF COLUSA, CALIFORNIA.

ADJUSTABLE BRACE.

Application filed May 16, 1922. Serial No. 561,366.

*To all whom it may concern:*

Be it known that I, WILLIAM LEMOIGNE, a citizen of the United States, and a resident of Colusa, county of Colusa, and State of California, have invented a new and useful Adjustable Brace, of which the following is a specification.

The present invention relates to improvements in braces used for imparting rotary motion to certain tools, such as drills, screw drivers, socket wrenches and others, and the particular object of the invention is to provide a brace of the character described that possesses features of adaptability to an extremely high degree and can be used in almost any corner or under any conditions where the ordinary brace would be practically useless. It is a further object of the invention to lend this character to the brace in a simple manner without increasing the cost of manufacturing the brace considerably.

With these objects in view I have illustrated the preferred form of my invention in the accompanying drawing, in which Figure 1 shows a side elevation of my brace; Figure 2 a side elevation of the same brace adjusted to meet different conditions; Figure 3 a longitudinal section through one of the joints used for connecting the different parts of my brace; Figure 4 a cross section through the same joint; Figure 5 a detail view of a universal joint used in the shank of the brace, and Figure 6 a detail view showing a reversible power transmission from one portion of the shank to the other. While I have shown only the preferred form of the invention I wish to have it understood that various changes or modifications may be made within the scope of the claim hereto attached without departing from the spirit of the invention.

My brace (1) consists of a handle (2), a shank (3) and a yoke (4) connecting the handle to the shank and facilitating the turning of the latter.

A principal feature of my invention is the yoke which consists preferably of a central member (6) and two links (7) and (8) pivotally connecting the ends of the central member to the handle and to the shank respectively by means of suitable pins (9). To receive the latter pins the ends of the central portion, the lower end of the handle and the upper end of the shank are bent at right angles, as shown at (11). Each bend terminates in a toothed disc (12) adapted to be engaged by a latch (13) in the links (7) or (8) respectively. The latter, which is shown in detail in Figure 4, pivots on a pin (14) within the recess (16) in the link and is normally forced into engagement with the toothed disc by a spring (17). When thus engaged the far end (18) of the latch projects beyond the outline of the link and is thus adapted to be engaged by the finger or thumb of the operator, who may press it into the recess over the resistance of the spring and thereby release the toothed disc (12) from the same. It will be seen that due to this construction the yoke may be bent into practically any shape desired and more particularly into the form shown in Figure 2, which shows the shank and the handle as being vertically alined and the central member (6), by means of which the yoke is rotated in parallel relation to the shank and handle but closer to the same so that its rotation takes up less space and allows the brace to be used in a corner where it could not be used if shaped as shown in Figure 1.

The shank (3) which also offers certain features of adjustability and thus co-operates with the features described in the preceding paragraph in increasing the adaptability of the brace consists principally of the three portions (21), (22) and (23). The portions (21) and (22) are joined by a reversible transmission well known in the art and illustrated in Figure 6. It comprises in its principal features a ratchet (24) secured on the portion (22) and two pawls (26) and (27) associated with the upper portion and normally forced into engagement with the ratchet by the spring (28). The two pawls act in opposing directions and if both are engaged they constitute a rigid connection between the two portions of the shank. A wedge (29) is interposed between the two pawls in such a manner that when the wedge is turned by the operator in one direction it disengages one pawl from the ratchet, and when turned in the other direction it disengages the other pawl. If, therefore, the wedge is thrown in engagement with one of the pawls the other pawl only will be active and transfer rotary motion from the upper portion to the central portion (22) in one direction only.

Abutments are shown as at (26′) and (27') for the heads of the pawls (26) and (27) to take the strain off the pawl pintles.

The lower portion (23) which is adapted to receive the bit or tool to be rotated is connected with the central portion (22) by means of the universal joint (31) shown in Figure 5 so that this lower portion may be rotated by the central portion (22) while the latter occupies an angular position relative to the same. If the particular situation does not call for the use of this particular feature and the operator wishes to eliminate the same, he needs only to slide the sleeve (32) on the central member (22) downward over the universal joint and the sleeve will then maintain the two lower members (22) and (23) in alinement.

The particular features of my brace will be readily understood from the foregoing description and it may be pointed out in particular that the three features described herein, to wit: the adjustable yoke, the reversible transmission and the universal joint, co-operate in making the brace an instrument of practically universal use.

I claim:

In a brace for turning a bit, a shank for receiving the bit bent at its upper end and terminating in a toothed disc, a handle turned at its lower end and terminating in a toothed disc, and a yoke interposed between the shank and the handle comprising a central member bent at either end and terminating in toothed discs and two connecting links pivotally engaging the discs having spring latches associated therewith for locking the links against pivotal motion.

WILLIAM LEMOIGNE.